United States Patent
Fujimura et al.

(10) Patent No.: US 11,325,842 B2
(45) Date of Patent: May 10, 2022

(54) NEAR INFRARED-REFLECTIVE BLACK PIGMENT AND METHOD FOR PRODUCING SAME

(71) Applicant: ISHIHARA SANGYO KAISHA, LTD., Osaka (JP)

(72) Inventors: Takeshi Fujimura, Osaka (JP); Norihiko Sanefuji, Osaka (JP); Kenji Kataoka, Osaka (JP)

(73) Assignee: ISHIHARA SANGYO KAISHA LTD, Osaka (JP)

( * ) Notice: Subject to any disclaimer, the term of this patent is extended or adjusted under 35 U.S.C. 154(b) by 0 days.

(21) Appl. No.: 16/490,126

(22) PCT Filed: Mar. 7, 2018

(86) PCT No.: PCT/JP2018/008705
§ 371 (c)(1),
(2) Date: Aug. 30, 2019

(87) PCT Pub. No.: WO2018/168596
PCT Pub. Date: Sep. 20, 2018

(65) Prior Publication Data
US 2020/0071187 A1    Mar. 5, 2020

(30) Foreign Application Priority Data

Mar. 14, 2017   (JP) .............................. JP2017-049174

(51) Int. Cl.
*C01G 45/00*     (2006.01)
*C09D 7/62*      (2018.01)

(52) U.S. Cl.
CPC ............. *C01G 45/006* (2013.01); *C09D 7/62* (2018.01); *C01P 2002/34* (2013.01);
(Continued)

(58) Field of Classification Search
CPC ..... C01G 45/006; C09D 7/62; C01P 2002/34; C01P 2202/70; C01P 2006/12; C01P 2006/62; C01P 2006/80
See application file for complete search history.

(56) References Cited

U.S. PATENT DOCUMENTS 6,299,815 B1    10/2001  Kimuar
2008/0134941 A1   6/2008  Sanada
(Continued)

FOREIGN PATENT DOCUMENTS

EP   1140704 B1 *  2/2003  ........... C03C 17/008
EP   3 075 709     10/2016
(Continued)

OTHER PUBLICATIONS

Search Report and Written Opinion issued in corresponding Singapore Application No. 11201908361W, dated Jun. 2, 2020, pp. 1-8.
(Continued)

*Primary Examiner* — Bijan Ahvazi
(74) *Attorney, Agent, or Firm* — Jeffrey S. Melcher; Melcher Patent Law PLLC (57) ABSTRACT

Provided is a method for producing a near infrared-reflective black pigment containing at least the element calcium, the element titanium, and the element manganese, wherein the method produces a pigment that exhibits little of the elution of the element calcium and the element manganese that is caused by contact with acid. At least a calcium compound, a titanium compound, and a manganese compound are mixed by a wet grinding method and are calcined to provide a BET specific surface area of at least 1.0 m²/g and less than 3.0 m²/g. In another method, the element bismuth and/or the element aluminum is incorporated in a near infrared-reflective black pigment containing at least the element calcium, the element titanium, and the element manganese.

10 Claims, 2 Drawing Sheets

(52) U.S. Cl.
CPC ...... *C01P 2002/70* (2013.01); *C01P 2006/12* (2013.01); *C01P 2006/62* (2013.01); *C01P 2006/80* (2013.01)

(56) References Cited

U.S. PATENT DOCUMENTS

| | | | |
|---|---|---|---|
| 2011/0068308 A1 | 3/2011 | Takaoka | |
| 2015/0255703 A1 | 9/2015 | Furuta | |
| 2017/0029627 A1* | 2/2017 | Isobe | ..................... C09D 7/61 |

FOREIGN PATENT DOCUMENTS

| | | | | |
|---|---|---|---|---|
| JP | 2001-048647 | 2/2001 | | |
| JP | 2006-249411 | 9/2006 | | |
| JP | 2010-202489 | 9/2010 | | |
| JP | 2010 270217 | 12/2010 | | |
| JP | 2010-270218 | 12/2010 | | |
| JP | 2014-214057 | 11/2014 | | |
| JP | 2014 214057 | 11/2014 | | |
| JP | 2014214057 A | * 11/2014 | ............. C01G 45/00 |
| JP | 2015180590 | 10/2015 | | |
| WO | 2015/080214 | 3/2017 | | |

OTHER PUBLICATIONS

International Search Report (translated) issued in PCT/JP2018/008705 dated May 22, 2018, pp. 1-2.
Written Opinion issued in PCT/JP2018/008705 dated May 22, 2018, pp. 1-3.
Search Report issued in corresponding European Patent Application No. 18768276.0, dated Dec. 18, 2020, pp. 1-12.
Weeraphat Pon-On et al: Influence of manganese substitution into the A-site of perovskite type CaMnTiOceramic11 , Ceramics International, Elsevier, Amsterdam, NL, vol. 37, No. 7, Oct. 6, 2010 (Oct. 6, 2010), pp. 2075-2079.

* cited by examiner

NEAR INFRARED-REFLECTIVE BLACK PIGMENT AND METHOD FOR PRODUCING SAME

TECHNICAL FIELD

The present invention relates to a near-infrared reflective black pigment and also to a method for producing the same.

BACKGROUND ART

A near-infrared reflective pigment is a material that reflects near-infrared rays contained in sunlight and the like. When this pigment is applied to, for example, the ground surface covered with asphalt, concrete, or the like or to a building, the amount of infrared rays absorbed thereby can be reduced. Therefore, such an application is effective in relieving the heat island phenomenon or increasing the cooling efficiency in buildings in summer, for example.

The present inventors have already proposed, as a near-infrared reflective black pigment, the perovskite-type composite oxide containing at least an alkaline earth metal element, titanium element, and manganese element (e.g., Patent Literatures 1 and 2).

Patent Literature 1 proposes the perovskite-type composite oxide infrared reflective pigment containing at least an alkaline earth metal element, titanium element, and manganese element, and states that a preferred BET specific surface area is about 0.05 to 80 $m^2/g$. Then, in the Examples, raw materials are thoroughly mixed and stirred in an agate mortar and then calcined, thereby producing the manganese-containing calcium titanate having the specific surface area of 0.32 to 1.54 $m^2/g$. In addition, in the same manner, an aluminum- and manganese-containing calcium titanate having the Al/Ti molar ratio of 0.007 to 0.04 and the specific surface area of 0.50 to 1.23 $m^2/g$ is also produced.

Patent Literature 2 proposes, as a perovskite-type composite oxide containing at least an alkaline earth metal element, titanium element, and manganese element, the infrared reflective black pigment having the BET specific surface area of 3.0 to 150 $m^2/g$ and having excellent hiding power and tinting strength. Then, in the Examples, raw materials are mixed in a wet mill, thereby producing an aluminum- and manganese-containing calcium titanate having the Al/Ti molar ratio of 0.007 and the specific surface area of 4.3 to 8.7 $m^2/g$.

CITATION LIST

Patent Literature

PATENT LITERATURE 1: JP 2010-202489 A
PATENT LITERATURE 2: WO 2015/080214 A1

SUMMARY OF INVENTION

Technical Problem

The pigments described in Patent Literatures 1 and 2 are black and have excellent near-infrared reflective properties. However, when such pigments come in contact with an acid, the alkaline earth metal element and manganese element, which are their constituent components, are likely to be eluted, causing problems in that the color tone of the pigments change, or the gloss of a paint film decrease (hereinafter, these problems will be sometimes collectively referred to as "improvement in acid resistance"). Accordingly, in the case of being used in the outdoor exposed to an acidic environment such as acid rain, or even in the case of being used in the indoor, it is required to further improve the acid resistance of near-infrared reflective pigments. The reason why the improvement is required in the case of being used in the indoor is that acidic pollutants in the atmospheric air, for example, may come in, whereby the pigments are exposed to an acidic environment.

Solution to Problem

The present inventors have conducted extensive research in light of the problems of prior art described above. As a result, they have found that when at least a compound of calcium element, a compound of titanium element, and a compound of manganese element are mixed by a wet milling method and calcined to make the BET specific surface area within a range of 1.0 $m^2/g$ or more and less than 3.0 $m^2/g$, a near-infrared reflective black pigment having improved acid resistance can be obtained, and thus accomplished the present invention.

In addition, they have also found that when the near-infrared reflective black pigment containing calcium element, titanium element, and manganese element described above contain specific amounts of aluminum element and/or bismuth element, the acid resistance can be further improved.

That is, the present invention encompasses the following inventions (1) to (11).

(1) A near-infrared reflective black pigment including at least a calcium element, a titanium element, a manganese element, and a bismuth element and having a perovskite phase as a main phase.

(2) The near-infrared reflective black pigment according to (1), wherein an atomic ratio ([Bi]/([Ti]+[Mn])) is 0.02 or less when the atomic ratio is expressed as the ratio of an atomic content of the bismuth element ([Bi]) to a sum of an atomic content of the titanium element ([Ti]) and an atomic content of the manganese element ([Mn]).

(3) The near-infrared reflective black pigment according to (1) or (2), including at least the calcium element, the titanium element, the manganese element, the bismuth element, and an aluminum element and having the perovskite phase as the main phase.

(4) The near-infrared reflective black pigment according to (3), wherein an atomic ratio ([Al]/([Ti]+[Mn])) is 0.1 or less when the atomic ratio is expressed as the ratio of an atomic content of the aluminum element ([Al]) to a sum of an atomic content of the titanium element ([Ti]) and an atomic content of the manganese element ([Mn]).

(5) The near-infrared reflective black pigment according to any one of (1) to (4), having a BET specific surface area of 1.0 $m^2/g$ or more and less than 3.0 $m^2/g$.

(6) A method for producing a near-infrared reflective black pigment, including mixing at least a calcium compound, a titanium compound, and a manganese compound by a wet milling method, followed by calcining the mixture at a temperature higher than 1100° C.,
wherein the near-infrared reflective black pigment has a perovskite phase as a main phase and a BET specific surface area of 1.0 $m^2/g$ or more and less than 3.0 $m^2/g$.

(7) The method for producing a near-infrared reflective black pigment according to (6), including mixing at least the calcium compound, the titanium compound, the manganese compound, and an aluminum compound by the wet milling method, followed by calcining the mixture.

(8) The method for producing a near-infrared reflective black pigment according to (6), including mixing at least the calcium compound, the titanium compound, the manganese compound, and a bismuth compound by the wet milling method, followed by calcining the mixture.

(9) The method for producing a near-infrared reflective black pigment according to (6), including mixing at least the calcium compound, the titanium compound, the manganese compound, an aluminum compound, and a bismuth compound by a wet milling method, followed by calcining the mixture.

(10) The method for producing a near-infrared reflective black pigment according to (7) or (9), wherein an atomic ratio ([Al]/([Ti]+[Mn])) is 0.1 or less when the atomic ratio is expressed as the ratio of an atomic content of the aluminum element ([Al]) to a sum of an atomic content of the titanium element ([Ti]) and an atomic content of the manganese element ([Mn]) in the near-infrared reflective black pigment.

(11) The method for producing a near-infrared reflective black pigment according to (8) or (9), wherein an atomic ratio ([Bi]/([Ti]+[Mn])) is 0.02 or less when the atomic ratio is expressed as the ratio of an atomic content of the bismuth element ([Bi]) to a sum of an atomic content of the titanium element ([Ti]) and an atomic content of the manganese element ([Mn]) in the near-infrared reflective black pigment.

Advantageous Effects of Invention

The present invention is a simple method in which raw material compounds are mixed by a wet milling method and calcined, whereby the BET specific surface area can be adjusted within a specific range, and a near-infrared reflective black pigment having improved acid resistance can be produced. In addition, when aluminum element and/or bismuth element is contained in the near-infrared reflective black pigment containing calcium element, titanium element, and manganese element, a near-infrared reflective black pigment having further improved acid resistance can be produced.

The near-infrared reflective black pigment has a BET specific surface area within a specific range and has a relatively large particle diameter, and thus is easy to disperse in a solvent and can be easily blended with a dispersion, a paint, an ink, or the like. In addition, the pigment can be easily kneaded into a resin and molded, kneaded at the time of spinning fibers, or fixed to the surface of a spun yarn, and is easy to use according to the scene of application.

DESCRIPTION OF EMBODIMENTS

The near-infrared reflective black pigment of the invention has the following properties.

(1) Crystal Structure

The near-infrared reflective black pigment has a perovskite phase as a main phase. As perovskite phases, an $ABO_3$-type structure, a layered perovskite-type structure ($n(ABO_3) \cdot AO$), and the like can be included. In the present invention, the pigment is a composite oxide wherein "A" in the above chemical formula contains at least calcium element, and "B" in the above chemical formula contains at least titanium element and manganese element. In the above chemical formula, "O" represents oxygen element, and theoretically three "O" exist therein. However, the actual pigment may have a defect.

The existence of a perovskite phase can be confirmed by powder X-ray diffraction. In the case where Cu-Kα is used as the radiation source, an $ABO_3$-type perovskite phase containing calcium element, titanium element, and manganese element as main constituent components shows main diffraction peaks near Bragg angles 2θ of 24°, 33.5°, 48°, and 60°. Incidentally, these peak positions may vary within a range of about ±1.5° depending on the composition. For example, with respect to the ratio between titanium element and manganese element, with an increase in manganese element, the peak position is shifted to the higher-angle side.

The fact that has a perovskite phase as a main phase means that the maximum peak in the powder X-ray diffraction pattern is attributed to a perovskite phase containing calcium element, titanium element, and manganese element as main constituent components. In the case of the $ABO_3$-type perovskite phase containing calcium element, titanium element, and manganese element as main constituent components described above, the peak near 2θ=33.5° is the main peak. In the present invention, the pigment may be also produced to have a peak attributed to a $CaTiO_3$ phase and/or a $CaMnO_3$ phase. In this case, it is preferable that the main peak intensity thereof is 0.1 or less with respect to the intensity of the main peak of the $ABO_3$-type perovskite phase containing calcium element, titanium element, and manganese element as main constituent components described above. It is preferable that the pigment is produced to be a perovskite single phase containing calcium element, titanium element, and manganese element as main constituent components.

As to an atomic ratio of manganese element to titanium element (Herein, the term "atomic ratio" means to be a ratio of the number of each atom (atomicity), that is, a ratio of the number of moles of each atom, and is also referred to as "molar ratio"), when an atomic content (atomicity) of titanium element is expressed as [Ti], and an atomic content (atomicity) of manganese element is expressed as [Mn], the atomic ratio is expressed as [Mn]/[Ti]. The atomic ratio [Mn]/[Ti] is preferably within a range of 0.5 to 2, and more preferably within a range of 0.8 to 1.2. In the case of [Mn]/[Ti]≥0.5, a near-infrared reflective pigment having high blackness and low reddishness can be obtained. In the case of [Mn]/[Ti]≤2, the near-infrared reflectance can be sufficiently enhanced. In the present application, the number of each atom (atomicity) is also referred to as the "atomic content" or "number of moles" of the atom, and is also simply referred to as "content".

(2) Blackness

The near-infrared reflective pigment of the present invention has high blackness, and can be suitably used as a black pigment. Specifically, when expressed as a lightness index L-value in the Hunter Lab color space (Lab colorimetric system) (called Hunter L-value; the lower the value, the higher the blackness), an L-value of 20 or less can be achieved. In particular, an L-value of 13 or less can be also achieved. A sample is thoroughly milled in an agate mortar and then placed in a φ30 mm aluminum ring, a load of 9.8 MPa is then applied to perform press-molding, and the measurement of powder color is performed using a color meter ZE2000 (manufactured by Nippon Denshoku Industries Co., Ltd.).

The a-value in the above Lab colorimetric system can be about −5 to 5, that is, the redishness can be suppressed low, and the a-value can be also about −0.5 to 1.5. In addition, the b-value in the Lab colorimetric system can be about −0.5 to 1.0, that is, a black color with reduced yellowishness can be achieved.

(3) Near-Infrared Reflective Properties

In the near-infrared reflective black pigment of the present invention, the near-infrared reflective properties of the powder expressed as reflectance at a wavelength of 1200 nm can be 57%, or can be also 63%. As shown in the Examples, according to the present invention, both acid resistance and near-infrared reflective properties can be simultaneously achieved at a high level. Also in the form of a paint film, high near-infrared reflective properties are exhibited. Specifically, the solar reflectance in a wavelength range of 780 to 2500 nm (i.e. the value calculated from the spectral reflectance in accordance with the weighting factor described in JIS K 5602) can be 35% or more, or can be also 40% or more.

(4) Preferred Additive 1 (Aluminum Element and/or Bismuth Element)

It is more preferable that aluminum element and/or bismuth element is contained in the near-infrared reflective black pigment containing at least calcium element, titanium element, and manganese element of the present invention described above.

In the case where aluminum element is contained, its content is, when expressed as an atomic ratio (molar ratio) with respect to a sum of a content of titanium element (Ti) and a content of manganese element (Mn), that is, [Al]/([Ti]+[Mn]), preferably 0.1 or less, and the amount that meets $0.01 \leq [Al]/([Ti]+[Mn]) \leq 0.1$ is more preferable. Here, [Al] represents the number of moles of aluminum element, [Ti] represents the number of moles of titanium element, and [Mn] represents the number of moles of manganese element. The improvement effect of acid resistance is observed when [Al]/([Ti]+[Mn]) is 0.01 or more, and the effect is more clearly observed when the ratio is 0.015 or more. From such a point of view, as a still more preferred value, the ratio may be also 0.03 or more. However, when the amount of aluminum element is too large, the a-value increases, resulting in a reddish color. In addition, particles become hard, thereby making it necessary to give a large amount of energy for the adjustment of particle size by milling. Further, when such a pigment is applied to a paint or the like, the dispersibility is likely to decrease. When [Al]/([Ti]+[Mn]) is 0.1 or less, there are almost no problems, and 0.07 or less is suitable. The existence state of aluminum element is unknown. However, when [Al]/([Ti]+[Mn]) is 0.1 or less, no clear peak attributed to an aluminum compound is observed with a powder X-ray diffraction, and thus it is presumed that aluminum element is solid-soluted in the perovskite phase.

In the case where bismuth element is contained therein, its content is, when expressed as an atomic ratio (molar ratio) with respect to a sum of a content of titanium element (Ti) and a content of manganese element (Mn), that is, [Bi]/([Ti]+[Mn]), preferably 0.1 or less, and the amount that meets $0.002 \leq [Bi]/([Ti]+[Mn]) \leq 0.02$ is more preferable. Here, [Bi] represents the number of moles of bismuth element, [Ti] represents the number of moles of titanium element, and [Mn] represents the number of moles of manganese element. The improvement effect of acid resistance is clearly observed when [Bi]/([Ti]+[Mn]) is 0.002 or more. However, when the content of bismuth element is too high, a different phase comes to be formed, and the near-infrared reflectance also starts to decrease therewith. When [Bi]/([Ti]+[Mn]) is 0.02 or less, there are almost no problems, and the case of 0.01 or less is more preferable. The existence state of bismuth element is unknown. However, when [Bi]/([Ti]+[Mn]) is 0.01 or less, no clear peak attributed to a Bi compound is observed with a powder X-ray diffraction, and thus it is presumed that bismuth element is solid-soluted in the perovskite phase. In the case where both aluminum element and bismuth element are contained, they can be contained at each atomic ratio (molar ratio) described above. In the case where aluminum element is contained, it is preferable that the BET specific surface area of the near-infrared reflective black pigment is 1.0 $m^2/g$ or more and less than 3.0 $m^2/g$. Meanwhile, in the case where bismuth element is contained, or in the case where bismuth element and aluminum element are contained, it is preferable that the BET specific surface area is 1.0 $m^2/g$ or more and less than 3.0 $m^2/g$. However, the BET specific surface area is not limited thereto, and may be also within a range of 1.0 $m^2/g$ or more and 10 $m^2/g$ or less.

In addition to a calcium compound, a titanium compound, and a manganese compound, an aluminum compound may be further mixed by the wet milling method described below and calcined. When aluminum element is contained, the acid resistance can be further enhanced. This is presumably because the instability of crystals resulting from the valency imbalance in the crystals or the existence of defects can be reduced by the addition of aluminum. As the aluminum compound, for example, an aluminum hydroxide, an aluminum oxide, or the like may be used. It is preferable that the aluminum compound is previously precipitated and made to exist on the particle surface of a compound of titanium, such as an oxide of titanium, a hydrated oxide of titanium, or a hydroxide of titanium, or is previously made to exist inside the particles. This is because aluminum element is likely to exist inside particles of the perovskite-type composite oxide. The method therefor is not particularly limited, and the well-known method may be used.

Also, in addition to the calcium compound, the titanium compound, and the manganese compound, a bismuth compound may be further mixed by the wet milling method described below and calcined. When bismuth element is contained, the acid resistance can be further enhanced. This is presumably because the instability of crystals resulting from the valency imbalance in the crystals or the existence of defects can be reduced by the addition of bismuth. As the bismuth compound, for example, a bismuth hydroxide, a bismuth oxide, or the like may be used.

(5) Preferred Additive 2 (Alkaline Earth Metal Element, Magnesium Element, and Rare Earth Element)

In the method for producing the near-infrared reflective black pigment of the present invention described above, in addition to a calcium compound, a compound of an alkaline earth metal element other than the calcium compound, such as strontium or barium, a compound of magnesium element, and a compound of a rare earth element such as yttrium may be further contained (i.e., used together), mixed by a wet milling method, and calcined. As the compound of the alkaline earth metal, the compound of the rare earth, and the compound of the magnesium, an oxide, a hydroxide, a carbonate, or the like thereof can be used. In particular, when the compound of magnesium element and the compound of calcium element are used together, the near-infrared reflectivity can be also improved. The content of magnesium can be suitably set according to the desired properties, such as near-infrared reflectivity. It is preferable that a molar ratio of magnesium element (Mg) to the alkaline earth metal·rare earth element ($A_1$) is $1.0 \times 10^{-6} \leq [Mg]/[A_1] \leq 0.20$, and still more preferably $1.0 \times 10^{-6} \leq [Mg]/[A_1] \leq 0.12$. Here, [Mg] represents the number of moles of magnesium element, and [$A_1$] represents the number of moles of the alkaline earth metal·rare earth element. In addition, it is preferable that the molar ratio of calcium element (Ca) to the alkaline earth metal other than calcium element·magnesium·rare earth element ($A_2$) is $0.8 \leq [Ca]/[A_2]$, and still more preferably $0.9 \leq [Ca]/[A_2]$. Here, [Ca] represents the number of moles of calcium element, and [$A_2$] represents the number of moles of the alkaline earth metal other than calcium element·rare earth element·magnesium element. The symbol "·" used herein means "and/or". Therefore, for example, the above "alkaline earth metal other than calcium element·rare earth element" contains at least one element of alkaline earth metal elements except for calcium element and rare earth elements, and the above "alkaline earth metal other than calcium element·rare earth element·magnesium element" contains at least one element of alkaline earth metal elements except for calcium element, rare earth elements, and magnesium element.

(6) Preferred Additive 3 (Element in Group 13 of the Periodic Table and Zinc Element)

In the production method for the near-infrared reflective black pigment of the present invention described above, a compound of an element in group 13 of the periodic table other than aluminum, such as boron, gallium, or indium, and a compound of zinc may be further contained, mixed by a wet milling method, and calcined. When these elements are contained, the near-infrared reflectivity can be further enhanced. As compounds of these elements, an oxide, a hydroxide, a carbonate, or the like of each element can be used. In the case where at least one of these compounds is mixed and its amount is small, it is preferable that the compound is previously made to exist on the particle surface of a titanium compound and/or inside the particles because a solid-phase synthesis reaction takes place uniformly, and a homogeneous near-infrared reflective black pigment is likely to be obtained. From such a reason, when a compound in group 13 of the periodic table or a zinc compound is previously precipitated and made to exist on the particle surface of a compound of titanium, such as an oxide, a hydrated oxide, or a hydroxide thereof, or is previously made to exist inside the particles, the element in group 13 of the periodic table or zinc element is likely to exist inside the particles of the perovskite-type composite oxide, and thus this is preferable. However, the method therefor is not particularly limited, and the well-known method may be used.

The element in group 13 of the periodic table other than aluminum, such as boron, gallium, or indium, may exist on the particle surface of the perovskite-type composite oxide and/or inside the particles, and preferably exist inside particles of the perovskite-type composite oxide. The content of these elements (elements in group 13 of the periodic table other than aluminum) can be suitably set according to the desired properties such as near-infrared reflectivity, and is preferably such an amount that the atomic ratio (molar ratio) of these elements (Ga) with respect to the sum of the content of titanium element (Ti) and the content of manganese element (Mn) is $0.0005 \leq [Ga]/([Ti]+[Mn]) \leq 1.5$. Here, [Ga] represents the number of moles of the element in group 13 of the periodic table other than aluminum, [Ti] represents the number of moles of titanium element, and [Mn] represents the number of moles of manganese element. As to the atomic ratio (molar ratio) $[Ga]/([Ti]+[Mn])$, its value is preferably within a range of 0.0005 to 1.5 because excellent near-infrared reflectivity is provided, more preferably $0.001 \leq [Ga]/([Ti]+[Mn]) \leq 0.45$, still more preferably $0.005 \leq [Ga]/([Ti]+[Mn]) \leq 0.35$, and most preferably $0.005 \leq [Ga]/[Ti] \leq 0.25$. When the value of $[Ga]/([Ti]+[Mn])$ is 0.0005 or more, its addition effect can be observed, while when the value of $[Ga]/([Ti]+[Mn])$ is 1.5 or less, the generation of a different phase is not observed.

Zinc element may exist on the particle surface of the perovskite-type composite oxide and/or inside the particles, and preferably exist inside particles of the perovskite-type composite oxide. The content of zinc element can be suitably set according to the desired properties such as near-infrared reflectivity, and is preferably such an amount that the atomic ratio (molar ratio) of zinc element (Zn) to the sum of the content of titanium element (Ti) and the content of manganese element (Mn) is $1.0 \times 10^{-6} \leq [Zn]/([Ti]+[Mn]) \leq 0.20$. Here, [Zn] represents the number of moles of zinc element, [Ti] represents the number of moles of titanium element, and [Mn] represents the number of moles of manganese element. As to the atomic ratio (molar ratio) $[Zn]/([Ti]+[Mn])$, its value is preferably within a range of $1.0 \times 10^{-6}$ to 0.20 because excellent near-infrared reflectivity is provided, more preferably $1.0 \times 10^{-6} \leq [Zn]/([Ti]+[Mn]) \leq 0.15$, and still more preferably $1.0 \times 10^{-6} \leq [Zn]/([Ti]+[Mn]) \leq 0.12$. When the value of $[Zn]/([Ti]+[Mn])$ is $1.0 \times 10^{-6}$ or more, its addition effect can be observed, while when the value of $[Zn]/([Ti]+[Mn])$ is 0.20 or less, the generation of a different phase or significant changes in the powder color are not observed.

In the case where the near-infrared reflective black pigment of the present invention has an $ABO_3$-type perovskite-type structure, when the contents of calcium element and the above alkaline earth metal other than calcium element·rare earth element·magnesium element added as necessary are expressed as "a mol", and the total amount of the contents of titanium element, manganese element, and the element in group 13 of the periodic table and/or zinc element added as necessary are expressed as "b mol", its ratio a/b is preferably adjusted to meet $0.9 \leq a/b \leq 1.4$. Within this range, sufficient near-infrared reflectivity is exhibited. In the case where the ratio is within a range of $0.9 \leq a/b \leq 1.1$, even when calcination is performed at a relatively low temperature, a different phase other than the perovskite-type structure is less likely to be formed. Thus, this range is more preferable.

As to calcium element, titanium element, and manganese element, contained in the near-infrared reflective black pigment, and the following elements that may be contained therein as necessary: aluminum element, bismuth element, the alkaline earth metal element other than the calcium element, the rare earth element, magnesium element, the element in group 13 of the periodic table other than aluminum element, and zinc element, the amounts thereof can be determined from X-ray fluorescence spectrometry.

In the near-infrared reflective black pigment produced in the present invention, impurities from various raw materials may be inevitably contained. Even in such a case, it is preferable that Cr is contained as little as possible, and even contained as an impurity, the content is 1 mass % or less. The content of $Cr^{6+}$, which raises safety concerns, is particularly preferably 10 ppm or less. In addition, it is preferable that unreacted residues of raw materials are also contained as little as possible, and its content is particularly preferably 1 mass % or less.

A second aspect of the present invention is the method for producing a near-infrared reflective black pigment, including mixing at least a calcium compound, a titanium compound, and a manganese compound by a wet milling method, followed by calcining the mixture at a temperature higher than 1100° C., the near-infrared reflective black pigment having a perovskite phase as a main phase and the BET specific surface area of 1.0 m$^2$/g or more and less than 3.0 m$^2$/g.

According to the second aspect of the present invention, the BET specific surface area of the near-infrared reflective black pigment produced is 1.0 m$^2$/g or more and less than 3.0 m$^2$/g. When raw materials are mixed by a wet milling method, and the mixture is calcined to make the specific surface area within the above range, the acid resistance can be improved. That is, it is possible to obtain a near-infrared reflective black pigment, in which the elution of constituent components can be reduced even in an acidic environment, and accordingly, changes in color tone and a decrease in gloss are reduced. As compared with mixing and milling in a dry process, when mixing and milling are performed in a wet process, the aggregation of each raw material powder, particularly a manganese dioxide raw material powder, can be reduced more, and raw materials having different particle diameters (i.e. a calcium compound, a manganese compound, a titanium compound) can be mixed more uniformly. Therefore, it is presumable that the instability of crystals resulting from the valency imbalance in the crystals or the existence of defects can be reduced. In the case where raw materials are not mixed by a wet milling method, even when the BET specific surface area is within the above range, the acid resistance is unlikely to improve. Even in the case where raw materials are mixed by a wet milling method, when the BET specific surface area is 3.0 m$^2$/g or more, the acid resistance is insufficient. In terms of acid resistance, the BET specific surface area is preferably 2.6 m$^2$/g or less, and more preferably 2.1 m$^2$/g or less. Meanwhile, considering the near-infrared reflective properties and dispersibility, the BET specific surface area is 1.0 m$^2$/g or more and less than 3.0 m$^2$/g, preferably 1.5 m$^2$/g or more and 2.6 m$^2$/g or less, and more preferably 1.6 m$^2$/g or more and 2.1 m$^2$/g or less. When the BET specific surface area is within such a range, in addition to the excellent acid resistance, the dispersibility at the time of blending with a paint or the like can be further enhanced, and the black near-infrared reflective material having excellent blackness and exhibiting even higher near-infrared reflective properties can be obtained. That is, the acid resistance, as well as the near-infrared reflective properties and dispersibility, which are in a trade-off relationship, can be balanced as a whole in a high region. The BET specific surface area is determined by a single-point method using nitrogen absorption.

The near-infrared reflective black pigment obtained by the production method of the present invention can be easily loosened by grinding after calcination. Then, such a pigment has high dispersibility when formed into a paint or mixed with a resin, and a high-quality paint or resin can be obtained. At the same time, the near-infrared reflectance when formed into a paint film can be also enhanced. This tendency is particularly notable in the case where the BET specific surface area is 1.6 m$^2$/g or more. As shown in the Examples, according to the present invention, acid resistance and dispersibility can be simultaneously achieved at a high level. By mixing the raw materials by a wet milling method, the aggregation of each raw material powder, particularly the manganese dioxide raw material powder can be reduced, and uniform mixing can be achieved, presumably resulting in the above effect. Specifically, the dispersity measured with a fineness gauge can be 20 μm or less, and preferably, the dispersity can be also 10 μm or less. The measurement method will be described in detail in the Examples.

As the calcium compound, calcium oxide, calcium hydroxide, calcium carbonate, or the like can be used. As the titanium compound and the manganese compound, an oxide, a hydroxide, a carbonate, or the like of each element can be used. These raw materials are weighed to make a predetermined composition.

Next, the above raw materials are mixed by a wet milling method. In the case of mixing them by a wet milling method, the well-known method can be performed. For example, a method using a wet mill can be illustrated. As the wet mill, the well-known machines can be suitably used. For example, it is possible to use the wet mill using a milling media, such as a wet ball mill, a wet bead mill, a sand grinder mill, or a medium stirring mill, or alternatively a wet mill not using a milling media, such as a stirring mill, a disc mill, an inline mill, or a wet jet mill. In the present invention, it is particularly preferable to use the wet mill using a milling media, such as a wet ball mill or a wet bead mill. This is because the effects of reducing the aggregation of each raw material powder, particularly the manganese dioxide raw material powder, and of uniformly mixing the raw materials having different particle diameters (i.e. a calcium compound, a manganese compound, a titanium compound) are high. The wet mill may be any of circulation-type, pass-type, and batch-type mills. The residence (milling) time, the number of passes, and the like in the wet milling are suitably set according to the facilities' capacity. In order to enhance the milling strength, the well-known milling media such as alumina and zirconia can be used. The diameter of the milling media may be suitably adjusted, and the milling media having a diameter of about 0.001 to 1 mm can be used, for example. Also, the packing density of the milling media in the wet mill may be suitably adjusted, and can be about 10 to 90% in volume, for example. As the dispersing medium used in the wet milling method of the present invention, an arbitrary solvent can be used. For example, water, alcohol, and the like can be illustrated, and it is preferable to use water. In the present invention, a dispersant may be added at the time of performing the wet milling, and a polymer dispersant such as a polyoxyalkylene-based dispersant or a polycarboxylate-type dispersant is preferably used, for example. The additive amount of the dispersant can be suitably set.

In the present invention, in the solvent after performing the wet milling, the volume-based cumulative 90% particle diameter of the raw material powder mixture is preferably 2.0 μm or less, and more preferably 1.5 μm or less. The conditions of the wet milling are suitably adjusted to be within the above range. The cumulative 90% particle diameter is determined by a laser diffraction/scattering method. Water is used as a dispersing medium, and the measurement is performed at a refractive index set at 1.800.

In the present invention, prior to performing the wet milling, the dry mixing may be also performed. When some or all of the raw materials described above are mixed in a dry process and subsequently mixed by wet milling, the burden on the wet mill can be reduced. As for the dry mixing, the well-known mixers and dry mills can be used. For example, a dry jet mill, a hammer mill, a dry bead mill, an impeller mill, and a dry ball mill can be used. As the dry mill, for example, an impact mill such as a hammer mill or a pin mill, a milling grinder such as a roller mill or a pulverizer, or a jet mill such as a dry jet mill can be used.

Also, after each of the raw materials is mixed by a wet milling method, the mixture may be filtered and dried, or spray-dried as necessary. In addition, as necessary, the mixture may be also granulated and/or molded, or may be suitably milled with the dry mill described above.

Next, the above raw material mixture is calcined. The calcination temperature can be suitably set within such a range that the BET specific surface area of the pigment provided by being calcined and being, as necessary, ground and/or milled can be adjusted to the above range, and is preferably a temperature higher than 1100° C., and more preferably within a range of 1100 to 1300° C. In the case of being within this range, the near-infrared reflective black pigment having the crystal phase and the BET specific surface area described above is likely to be obtained. The BET specific surface area of the calcined pigment somewhat varies due to the additive elements described above, the additive(s) for calcination described below, or the like. In this case, the calcination temperature may be suitably fine-tuned with reference to the above temperature range as a guide. In particular, the temperature within a range of 1180 to 1250° C. is more preferable.

The atmosphere at the time of performing the calcination may be any atmosphere. In particular, the calcination in an oxygen-containing atmosphere makes it possible to maintain sufficient near-infrared reflective properties, and thus is preferable. And, the calcination in air is more preferable.

The calcination time can be suitably set. When the time is 0.5 to 24 hours, the near-infrared reflective black pigment having the crystal phase and the BET specific surface area described above is likely to be obtained. The BET specific surface area of the calcined pigment somewhat varies due to the additive elements described above and the additive(s) for calcination described below, and thus the calcination time may be suitably fine-tuned. In particular, the time is preferably 1.0 to 12 hours. Although the time may be 24 hours or more, this is not economical.

As for the calcination, the well-known devices may be used. As the calcination devices, an electric furnace, a rotary kiln, and the like can be illustrated.

The calcined pigment may be ground and/or milled as necessary. As for the grinding and/or milling, the dry mill described above may be used.

(A) Preferred Production Method 1 (Addition of Additive(s) for Calcination)

In order to perform the above calcination reaction more uniformly, or to make the particle diameter of the near-infrared reflective black pigment more uniform, additive(s) for calcination (particle size adjusting agent) may be added to the mixture of the raw material compounds and calcined. As the additive(s) for calcination, for example, an alkali metal compound, a silicon compound such as silica or a silicate, a tin compound such as tin oxide or tin hydroxide, or a compound of an element in group 13 of the periodic table, such as boron, aluminum, gallium, or indium, can be used. However, examples of the additive(s) for calcination are not limited thereto, and various inorganic compounds or organic compounds can be used. The additive amount of the additive(s) for calcination (particle size adjusting agent) can be suitably set, but is preferably such an amount that the near-infrared reflectivity is not reduced. In particular, when an alkali metal compound is added to the mixture of raw material compounds and calcined, the near-infrared reflective black pigment having a more uniform particle diameter is likely to be obtained. Therefore, this is preferable. Moreover, the addition of an alkali metal compound is also advantageous in that the milling after performing the calcination becomes relatively easy. In addition, even when the alkali metal compound remains in the obtained near-infrared reflective black pigment, such a compound has no adverse effects on the near-infrared reflectivity and can also be dissolved away by washing with water. As the alkali metal compound, a potassium compound such as potassium chloride, potassium sulfate, potassium nitrate, or potassium carbonate, a sodium compound such as sodium chloride, sodium sulfate, sodium nitrate, or sodium carbonate, a lithium compound such as lithium chloride, lithium sulfate, lithium nitrate, or lithium carbonate, or the like can be used. As to the additive amount of alkali metal compound, when the alkali metal is calculated as an oxide ($K_2O$, $Na_2O$, $Li_2O$, etc.), the amount is preferably 0.01 to 15 parts by mass, more preferably 0.1 to 6 parts by mass, with respect to 100 parts by mass of the mixture of the raw material compounds.

(B) Preferred Production Method 2 (Recalcination)

The near-infrared reflective black pigment produced in the present invention may be also subjected to recalcination. The recalcination further enhances the crystallinity of the composite oxide, whereby the water elution of calcium element, manganese element, and the like can be reduced, and thus is preferable. The recalcination temperature is preferably within a range of 200 to 1250° C., and more preferably 400 to 1230° C. The atmosphere at the time of performing the recalcination may be any atmosphere. However, in order to maintain the sufficient near-infrared reflectivity, the recalcination in air is preferable. The recalcination time may be suitably set, but is preferably 0.5 to 24 hours, and more preferably 1.0 to 12 hours.

(C) Preferred Production Method 3 (Surface Treatment)

In the present invention, a step of coating the surface of the near-infrared reflective black pigment particles with an inorganic compound and/or an organic compound may be also performed. As a result, the dispersibility in the solvent or resin blended in the case of applications to paints, inks, plastics, ceramics, electronic materials, and the like can be enhanced. As the inorganic compound, for example, at least one compound selected from silicon, zirconium, aluminum, titanium, antimony, phosphorus, and tin is preferable. In the case of silicon, zirconium, aluminum, titanium, antimony, and tin, it is more preferable that each of them is an oxide compound, a hydrated oxide, or a hydroxide thereof. In the case of phosphorus, it is more preferable to be a compound of phosphoric acid or a phosphate. As the organic compound, for example, organosilicon compounds, organometallic compounds, polyols, alkanolamines and derivatives thereof, higher fatty acids and metal salts thereof, higher hydrocarbons and derivatives thereof, and the like can be illustrated, and at least one selected therefrom can be used.

As a result of coating with the inorganic compound, the water elution resistance or acid resistance of the near-infrared reflective black pigment obtained by the method of the present invention can be further improved. From this point of view, in particular, each oxide, hydrated oxide, and hydroxide of silicon and aluminum are preferable. As the oxide, hydrated oxide, or hydroxide of silicon (which is also referred as silica, hereinafter), those forming a high-density silica or a porous silica are more preferable. Depending on the pH range at the time of the silica coating treatment, the coated silica becomes porous or non-porous (high-density). The high-density silica makes it easy to form a dense coating, and thus is highly effective in reducing the water elution of the near-infrared reflective pigment, and is more preferable. Accordingly, it is also possible that a first coating layer of the high-density silica is made to exist on the particle surface of the near-infrared reflective black pigment, and a second coating layer of the porous silica or an oxide, hydrated oxide, or hydroxide of aluminum (which is also referred to alumina, hereinafter) is made to exist thereon. The silica coating can be observed with an electron microscope. The coating amount of the inorganic compound can be suitably set, and is preferably 0.1 to 50 mass %, more preferably 1.0 to 20 mass %, with respect to the near-infrared reflective black pigment, for example. The amount of inorganic compound can be measured in a usual manner, such as X-ray fluorescence spectrometry or ICP atomic emission spectrometry.

As a method for coating the particle surface of the near-infrared reflective black pigment with the inorganic compound and/or the organic compound, a conventional surface treatment method, such as for a titanium dioxide pigment, can be used. Specifically, it is preferable that the inorganic compound or the organic compound is added to the slurry of the near-infrared reflective black pigment, thereby being coated on the near-infrared reflective black pigment. It is more preferable that the inorganic compound or the organic compound is neutralized and precipitated in the slurry, thereby being coated on the near-infrared reflective black pigment. In addition, it is also possible that the inorganic compound or the organic compound is added to a powder of the near-infrared reflective black pigment and mixed, thereby being coated on the near-infrared reflective black pigment.

Specifically, in order to coat the particle surface of the near-infrared reflective black pigment with the high-density silica, first, an aqueous slurry of the near-infrared reflective black pigment is adjusted to pH 8 or more, preferably pH 8 to 10, with an alkali compound (e.g., sodium hydroxide, potassium hydroxide), ammonia, or the like, and then heated to 70° C. or more, preferably 70 to 105° C. Next, a silicate is added to the aqueous slurry of the near-infrared reflective black pigment. As the silicate, any of various silicates, such as sodium silicate and potassium silicate, can be used. The addition of the silicate is usually preferably performed over 15 minutes or more, more preferably 30 minutes or more. Next, after the completion of the addition of the silicate, as necessary, the mixture is further thoroughly stirred and mixed. Subsequently, while maintaining the temperature of the slurry preferably at 80° C. or more, more preferably at 90° C. or more, neutralization is performed with an acid. As the acid used herein, sulfuric acid, hydrochloric acid, nitric acid, phosphoric acid, acetic acid, and the like can be illustrated. With such an acid, the pH of the slurry is adjusted preferably to 7.5 or less, more preferably to 7 or less, whereby the particle surface of the near-infrared reflective black pigment can be coated with the high-density silica.

Also, in order to coat the particle surface of the near-infrared reflective black pigment with the porous silica, first, an acid such as sulfuric acid, hydrochloric acid, nitric acid, phosphoric acid, or acetic acid is added to the aqueous slurry of the near-infrared reflective black pigment to adjust the pH to 1 to 4, preferably to 1.5 to 3. The slurry temperature is preferably adjusted to 50 to 70° C. Next, while maintaining the slurry pH within the above range, a silicate and an acid are added to form the coating of the porous silica. As the silicate, any of various silicates, such as sodium silicate and potassium silicate, can be used. The addition of the silicate is usually preferably performed over 15 minutes or more, more preferably 30 minutes or more. After the completion of the addition of the silicate, as necessary, an alkali compound is added to adjust the pH of the slurry to about 6 to 9, whereby the particle surface of the near-infrared reflective black pigment can be coated with the porous silica.

Meanwhile, in order to coat the particle surface of the near-infrared reflective black pigment with alumina, first, it is preferable that the slurry of the near-infrared reflective black pigment is neutralized to pH 8 to 9 with an alkali such as sodium hydroxide, and then heated to the temperature of 50° C. or more, and next, an aluminum compound and an acidic aqueous solution are performed by the simultaneous parallel addition. As the aluminum compound, an aluminate such as sodium aluminate or potassium aluminate can be suitably used, while as the acidic aqueous solution, an aqueous solution of sulfuric acid, hydrochloric acid, nitric acid, or the like can be suitably used. The simultaneous parallel addition described above refers to a method in which the aluminum compound and the acidic aqueous solution are each separately added in small amount to a reactor continuously or intermittently. Specifically, it is preferable that while maintaining the pH in the reactor at 8.0 to 9.0, the both are simultaneously added over about 10 minutes to 2 hours. After the addition of the aluminum compound and the acidic aqueous solution, the addition of the acidic aqueous solution is preferably further performed to adjust the pH to about 5 to 6.

When the near-infrared reflective black pigment coated with the inorganic compound is recalcined, the crystallinity of the near-infrared reflective black pigment is further enhanced, and the water elution resistance and the acid resistance can be further improved. The recalcination temperature is preferably within the range of 200 to 1250° C., and more preferably 400 to 1230° C. The atmosphere at the time of performing the recalcination may be any atmosphere. However, in order to maintain the sufficient near-infrared reflectivity, the recalcination in air is preferable. The recalcination time may be suitably set, but is preferably 0.5 to 24 hours, and more preferably 1.0 to 12 hours.

The near-infrared reflective black pigment obtained by the above production method can be used in various forms, such as a powder and a molded body. When used in the form of the powder, the pigment may be suitably milled as necessary to regulate the particle size, while when used in the form of the molded body, the powder may be molded into a suitable size and shape. As the mill, for example, an impact mill such as a hammer mill or a pin mill, a milling grinder such as a roller mill or a pulverizer, or a jet mill such as a jet mill can be used. As the molding machine, for example, a general-purpose molding machine such as an extruder or granulating machine, can be used.

The near-infrared reflective black pigment obtained by the production method of the present invention is a material having sufficient near-infrared reflectivity, but may be also mixed with different compound(s) having infrared reflectivity and used. As a result, the near-infrared reflectivity can be further enhanced, or the reflectivity at a specific wavelength can be complemented. As the different compound(s) having infrared reflectivity, those conventionally used can be used. For example, an inorganic compound such as titanium dioxide, an iron-chrome compound, a manganese-bismuth compound, and an yttrium-manganese compound can be illustrated. The kind(s) and mixing ratio(s) of the different compound(s) having near-infrared reflectivity above can be suitably selected according to the intended use.

The near-infrared reflective black pigment obtained by the production method of the present invention can be also mixed with different pigment(s) and used. For example, it is possible to further increase the blackness, adjust the color to gray or adjust the color so as to have a neutral color such as red, yellow, green, and blue. As the different pigment(s), an inorganic pigment, an organic pigment, a lake pigment, and the like can be used. Specifically, as the inorganic pigment, a white pigment such as titanium dioxide, zinc oxide, and precipitated barium sulphate, a red pigment such as iron oxide, a blue pigment such as ultramarine blue and Prussian blue (potassium ferrocyanide), a black pigment such as carbon black, and a pigment such as an aluminum powder can be illustrated. As the organic pigment, an organic compound such as anthraquinone, perylene, phthalocyanine, an azo-based pigment, and an azomethine azo-based pigment can be illustrated. The kind(s) and mixing ratio(s) of the different pigment(s) above can be suitably set according to the color and/or hue.

The near-infrared reflective black pigment obtained by the production method of the present invention can be used for a solvent dispersion. As its solvents, inorganic solvents such as water, organic solvents such as alcohols, alkyls, glycols, ethers, ketones, benzenes, and acetate, and mixed solvents of an inorganic solvent and an organic solvent can be used. The concentration of the near-infrared reflective black pigment can be suitably adjusted, and is preferably about 1 to 1000 g/L. The solvent dispersion may have blended therewith a dispersant, a pigment, a filler, an aggregate, a thickener, a flow controller, a leveling agent, a curing agent, a crosslinking agent, a curing catalyst, or the like. The production of a solvent dispersion can be performed by the well-known method, and it is preferable that the near-infrared reflective black pigment is dispersed in a solvent using a wet mill. As the wet mill, the well-known machine can be suitably used, and it is possible to use a wet mill using media, such as a bead mill, a sand grinder mill, or a medium stirrer mill, or alternatively a wet mill not using media, such as a stirrer mill, a disc mill, an inline mill, or a jet mill. In the present invention, in order to sufficiently disperse the near-infrared reflective black pigment, the wet mill using media is preferable.

The near-infrared reflective black pigment obtained by the production method of the present invention can be used for a paint. The paint includes a composition referred to as "ink". In addition, the pigment can be used for a resin composition. In addition, the pigment can be used for a fiber composition. In addition, it is also possible that the paint is applied onto a substrate and used as a near-infrared reflective material.

When contained in a paint, an ink, or a resin of a plastic molded product such as a film, the near-infrared reflective black pigment obtained by the production method of the present invention can provide a composition utilizing its excellent near-infrared reflectivity. In the paint, the ink, or the resin composition, the near-infrared reflective black pigment can be contained in an arbitrary amount with respect to the resin. The amount is preferably 0.1 mass % or more, more preferably 1 mass % or more, and still more preferably 10 mass % or more. In addition, composition-forming materials used in each field may be blended, and further various additives may also be blended.

Specifically, in the case of providing the paint or the ink, in addition to a paint film-forming material or an ink film-forming material, a solvent, a dispersant, a pigment, a filler, an aggregate, a thickener, a flow controller, a leveling agent, a curing agent, a crosslinking agent, a curing catalyst, and the like may be blended. As the paint film-forming material, for example, an organic component, such as an acrylic resin, an alkyd-based resin, a urethane-based resin, a polyester-based resin, or an amino-based resin, or an inorganic component, such as organosilicate, organotitanate, cement, or gypsum, can be used. As the ink film-forming material, a urethane-based resin, an acrylic resin, a polyamide-based resin, a vinyl chloride acetate-based resin (a copolymer resin of a vinyl chloride-based resin and a vinyl acetate-based resin), a chlorinated propylene-based resin, or the like can be used. For such paint film-forming materials and ink film-forming materials, thermosetting resins, room temperature-curable resins, UV-curable resins, and like various resins can be used without limitations. When a UV-curable resin in the form of a monomer or an oligomer is used, a photopolymerization initiator or a photosensitizer is blended, and the application is followed by UV light irradiation to cure, a paint film having excellent hardness and adherence can be obtained without a thermal load on the substrate. Therefore, this is preferable.

The paint described above can be applied onto a substrate to produce a near-infrared reflective material. This near-infrared reflective material can be used as an infrared shielding material, or further as a heat shielding material. That is, the material can be used as an infrared reflective material. As the substrate, any of various materials and material qualities can be used. Specifically, various building materials, construction materials, and the like can be used. The produced near-infrared reflective material can be used as a roofing material, a walling material, and a flooring material of a house, a factory, or the like, or as a paving material to form a road or a sidewalk, for example. The thickness of the near-infrared reflective material can be arbitrarily set according to the intended use. For example, for use as the roofing material, it is about 0.1 to 0.6 mm, preferably 0.1 to 0.3 mm, while for use as the paving material, it is about 0.5 to 5 mm, preferably 1 to 5 mm. For applying the paint onto the substrate, application, a method by spraying, or a method by troweling is possible. After the application, the paint may be dried, baked, or cured as necessary.

In the case of providing a resin composition, in addition to the resin, a pigment, a dye, a dispersant, a lubricant, an antioxidant material, a UV absorber, a light stabilizer, an antistatic agent, a flame retardant, a disinfectant, and the like are kneaded together with the near-infrared reflective black pigment obtained by the production method of the present invention, and molded into an arbitrary shape such as the shape of a film, a sheet, or a plate. As the resin, it is possible to use a thermoplastic resin, such as a polyolefin-based resin, a polystyrene-based resin, a polyester-based resin, an acrylic resin, a polycarbonate-based resin, a fluorine-based resin, polyamide-based resin, a cellulose-based resin, or a polylactic acid-based resin, or a thermosetting resin, such as a phenol-based resin or a urethane-based resin. Such a resin composition can be molded into an arbitrary shape, such as a film, a sheet, or a plate, and used as a near-infrared reflective material for industrial use, agricultural use, home use, or the like. In addition, the resin composition can also shield infrared rays to serve as a heat shielding material.

A fiber composition containing the near-infrared reflective black pigment obtained by the production method of the present invention is capable of imparting near-infrared reflectivity to garments, woven fabrics, nonwoven fabrics, wallpapers, and the like. As the fiber, any of the well-known fibers can be used. For example, cellulose regenerated fibers such as rayon, polyamide fibers such as nylon, polyesters such as polyethylene terephthalate, acrylic fibers, carbon fibers, and the like can be mentioned. The near-infrared reflective black pigment can be kneaded during spinning fibers or fixed to the surface of a spun yarn, and used. As methods therefor, conventional methods can be suitably used. In addition, the near-infrared reflective black pigment can be contained in an arbitrary amount with respect to the fiber, and is preferably 0.1 mass % or more, and more preferably 1 mass % or more.

Hereinafter, the present invention will be described with reference to examples and comparative examples. However, the present invention is not limited to these examples.

EXAMPLES (Experiment 1)

Example 1

32.72 g of calcium carbonate $CaCO_3$ (manufactured by Konoshima Chemical Co., Ltd.), 13.04 g of titanium dioxide (manufactured by Ishihara Sangyo Kaisha, Ltd.), and 14.12 g of manganese dioxide (manufactured by Tosoh Corporation) were taken and placed in a 220-mL mayonnaise jar. Further, 100 g of glass beads and pure water were added, and thoroughly mixed and milled using a paint shaker (time: 30 minutes). This raw material mixture was dried and then calcined at 1200° C. for 4 hours. This calcined product was milled in an automatic mortar, thereby obtaining Sample A.

Sample A was analyzed with a fluorescent X-ray analyzer (RIX-2100 manufactured by Rigaku Corporation) and a powder X-ray diffractometer (UltimaIV manufactured by Rigaku Corporation). As a result, the sample was a composite oxide single phase having an $ABO_3$-type perovskite structure containing titanium, manganese, and calcium, and the atomic ratio (molar ratio) of manganese to titanium expressed as [Mn]/[Ti] was 1.00. In addition, by using a laser diffraction/scattering particle size distribution analyzer (LA-910 manufactured by HORIBA, Ltd.), the particle size distribution of the raw material mixture after milling and mixing was measured. As a result, the cumulative 90% particle diameter (volume basis) was 1.29 μm.

Example 2

Sample B was obtained by the same operation as in Example 1, except that the calcination temperature was changed to 1180° C.

As a result of analyzing Sample B in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

Example 3

Sample C was obtained by the same operation as in Example 1, except that the calcination temperature was changed to 1300° C.

As a result of analyzing Sample C in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

Comparative Example 1

32.72 g of calcium carbonate, 13.04 g of titanium dioxide, and 14.12 g of manganese dioxide were taken, thoroughly mixed in an automatic mortar, and then calcined at 1150° C. for 4 hours. This calcined product was milled in an automatic mortar, thereby obtaining Sample D.

As a result of analyzing Sample D in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

Comparative Example 2

Sample E was obtained by the same operation as in Comparative Example 1, except that the calcination temperature was changed to 1180° C.

As a result of analyzing Sample E in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

Comparative Example 3

Sample F was obtained by the same operation as in Comparative Example 1, except that the calcination temperature was changed to 1200° C.

As a result of analyzing Sample F in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

Comparative Example 4

Sample G was obtained by the same operation as in Example 1, except that the calcination temperature was changed to 1160° C.

As a result of analyzing Sample G in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

Comparative Example 5

Sample H was obtained by the same operation as in Example 1, except that the calcination temperature was changed to 1140° C.

As a result of analyzing Sample H in the same manner as in Example 1, the sample was a composite oxide single phases having an $ABO_3$-type perovskite structure containing titanium, manganese, and calcium, and the atomic ratio (molar ratio) of manganese to titanium [Mn]/[Ti] was 1.00.

(Evaluation 1) Measurement of BET Specific Surface Area

The BET specific surface area of each sample was measured. For the measurement, Macsorb HM model 1220 (manufactured by Mountech Co., Ltd.) was used, and calculation was performed by a BET single-point method using nitrogen absorption.

(Evaluation 2) Evaluation of Acid Resistance

First, a sample, a polyester resin (VYLON GK-19CS manufactured by Toyobo Co., Ltd.), and a melamine resin (SUPER BECKAMINE L-109 manufactured by DIC Corporation) were adjusted to make PB (pigment/resin weight ratio)=0.8 and SVC (solid content volume concentration) =44.7%, thereby preparing a paint. The prepared paint was applied onto a steel plate using a #15 bar coater and baked at 210° C. for 10 minutes, thereby preparing a paint film piece. The prepared paint film piece was immersed in 5% sulfuric acid for 48 hours. As to the paint film applied onto the steel plate, the 60° gloss before and after immersion was measured, and changes in gloss (gloss retention) from the initial paint film were evaluated. In addition, a comparison was made between a paint film piece after immersion in an acid and a paint film piece before immersion, and changes in color were visually observed. The two were used as an index of acid resistance. For the measurement of 60° gloss, a glossmeter (VG-2000 manufactured by Nippon Denshoku Industries Co., Ltd.) was used. The criteria for the color change observation were as follows: "○" indicates that there was almost no change, "Δ" indicates clear discoloration, "×" indicates significant discoloration.

Figure 1:
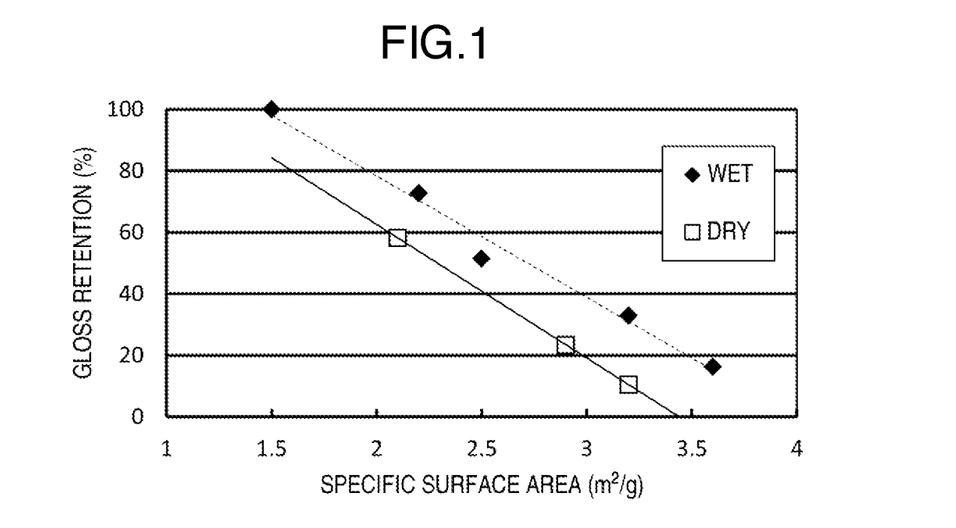
FIG. 1 shows the relationship between the specific surface area and gloss retention of each sample in Experiment 1.

The evaluation results of Samples A to H are shown in Table 1. In this connection, FIG. 1 shows a graph plotting the specific surface area and the gloss retention. As the specific surface area decreased, the gloss retention after immersion sulfuric acid improved. In both of the dry milling and the wet milling, within each raw material mixing method, the relationship was almost linear. Then, a comparison between a dry milling method and a wet milling method with the same specific surface area shows that mixing in a wet process resulted in an improvement of about 20% in gloss retention. That is, the balance of specific surface area and gloss retention was able to be shifted to a higher-property side. The color change was also reduced as a result of mixing by wet milling. As compared with mixing and milling in a dry process, when mixing and milling were performed in a wet process, the aggregation of each raw material powder, particularly a manganese dioxide raw material powder, was able to be reduced more, and raw materials having different particle diameters (i.e. a calcium compound, a manganese compound, a titanium compound) were able to be mixed more uniformly, which was presumably advantageous in improving the acid resistance. When the specific surface area is less than 3 $m^2/g$, the gloss retention of 40% or more can be expected. When the specific surface area is 2.6 $m^2/g$ or less, the gloss retention of 50% or more can be expected, and no significant discoloration will take place; therefore, this is preferable. When the specific surface area is 2.1 $m^2/g$ or less, the gloss retention of 70% or more can be expected, and almost no discoloration will be seen. Therefore, this is more preferable.

beads and pure water were added, and thoroughly mixed and milled using a paint shaker (time: 30 minutes). This raw material mixture was dried and then calcined at 1180° C. for 4 hours. This calcined product was milled in an automatic mortar, thereby obtaining Sample I.

As a result of analyzing Sample I in the same manner as in Example 1, the sample was a composite oxide single phase having an $ABO_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese expressed as [Al]/([Ti]+[Mn]) was 0.011, and the atomic ratio (molar ratio) of bismuth to titanium and manganese expressed as [Bi]/([Ti]+[Mn]) was 0.0053. Sodium was contained at 0.13 mass % as $Na_2O$.

Example 5

Sample J was obtained in the same manner as in Example 4, except that the amount of aluminum hydroxide was changed to 0.44 g, and the calcination temperature was changed to 1150° C.

As a result of analyzing Sample J in the same manner as in Example 1, the sample was a composite oxide single phase having an $ABO_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.017, and the atomic ratio (molar ratio) of bismuth to titanium and manganese [Bi]/([Ti]+[Mn]) was 0.0053.

Example 6

Sample K was obtained in the same manner as in Example 5, except that the calcination temperature was changed to 1200° C.

As a result of analyzing Sample K in the same manner as in Example 1, the sample was a composite oxide single phase having an $ABO_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to

TABLE 1

|  | Sample | Calcination temperature (° C.) | Grinding method | Specific surface area ($m^2/g$) | Color change | Gloss Retention (%) |
|---|---|---|---|---|---|---|
| Example 1 | A | 1200 | Wet | 2.2 | ○ | 72.6 |
| Example 2 | B | 1180 | Wet | 2.5 | ○ | 51.5 |
| Example 3 | C | 1300 | Wet | 1.5 | ○ | 100 |
| Comparative Example 1 | D | 1150 | Dry | 3.2 | X | 10.5 |
| Comparative Example 2 | E | 1180 | Dry | 2.9 | X | 23.4 |
| Comparative Example 3 | F | 1200 | Dry | 2.1 | Δ | 58.2 |
| Comparative Example 4 | G | 1160 | Wet | 3.2 | X | 32.9 |
| Comparative Example 5 | H | 1140 | Wet | 3.6 | X | 16.3 |

(Experiment 2)

Example 4

In addition to 32.72 g of calcium carbonate, 13.04 g of titanium dioxide, and 14.12 g of manganese dioxide, which are the same as those used in Experiment 1, 0.29 g of aluminum hydroxide (manufactured by Kishida Chemical Co., Ltd.), 0.41 g of bismuth oxide (manufactured by Kanto Chemical Co., Ink.), and 0.60 g of sodium chloride (manufactured by Wako Pure Chemical Industries) were taken and placed in a 220-mL mayonnaise jar. Further, 100 g of glass titanium and manganese [Al]/([Ti]+[Mn]) was 0.017, and the atomic ratio (molar ratio) of bismuth to titanium and manganese [Bi]/([Ti]+[Mn]) was 0.0053.

Example 7

Sample L was obtained in the same manner as in Example 6, except that the amount of aluminum hydroxide was changed to 0.88 g.

As a result of analyzing Sample L in the same manner as in Example 1, the sample was a composite oxide single phase having an ABO$_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.034, and the atomic ratio (molar ratio) of bismuth to titanium and manganese [Bi]/([Ti]+[Mn]) was 0.0053.

Example 8

Sample M was obtained in the same manner as in Example 6, except that the amount of aluminum hydroxide was changed to 1.50 g.

As a result of analyzing Sample M in the same manner as in Example 1, the sample was a composite oxide single phase having an ABO$_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.055, and the atomic ratio (molar ratio) of bismuth to titanium and manganese [Bi]/([Ti]+[Mn]) was 0.0053.

Example 9

Sample N was obtained in the same manner as in Example 6, except that the amount of aluminum hydroxide was changed to 3.00 g.

As a result of analyzing Sample N in the same manner as in Example 1, the sample was a composite oxide single phase having an ABO$_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.11, and the atomic ratio (molar ratio) of bismuth to titanium and manganese [Bi]/([Ti]+[Mn]) was 0.0053.

Example 10

Sample O was obtained in the same manner as in Example 6, except that bismuth oxide and sodium chloride were not used.

As a result of analyzing Sample O in the same manner as in Example 1, the sample was a composite oxide single phase having an ABO$_3$-type perovskite structure containing titanium, manganese, calcium, and aluminum. The atomic ratio (molar ratio) of manganese to titanium [Mn]/[Ti] was 1.00, and the atomic ratio (molar ratio) of aluminum to titanium and manganese [Al]/([Ti]+[Mn]) was 0.017.

Example 11

Sample P was obtained by the same operation as in Example 5, except that the calcination temperature was changed to 1300° C.

As a result of analyzing Sample P in the same manner as in Example 1, the sample was a composite oxide single phase having an ABO$_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.017, and the atomic ratio (molar ratio) of bismuth to titanium and manganese [Bi]/([Ti]+[Mn]) was 0.0053.

Example 12

Sample Q was obtained by the same operation as in Example 7, except that the calcination temperature was changed to 1300° C.

As a result of analyzing Sample Q in the same manner as in Example 1, the sample was a composite oxide single phase having an ABO$_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.034, and the atomic ratio (molar ratio) of bismuth to titanium and manganese [Bi]/([Ti]+[Mn]) was 0.0053.

Example 13

Sample R was obtained by the same operation as in Example 8, except that the calcination temperature was changed to 1300° C.

As a result of analyzing Sample R in the same manner as in Example 1, the sample was a composite oxide single phase having an ABO$_3$-type perovskite structure containing titanium, manganese, calcium, aluminum, and bismuth. [Mn]/[Ti] was 1.00, [Al]/([Ti]+[Mn]) was 0.055, and [Bi]/([Ti]+[Mn]) was 0.0053.

Example 14

Sample S was obtained by the same operation as in Example 9, except that the calcination temperature was changed to 1300° C.

As a result of analyzing Sample S in the same manner as in Example 1, the sample was a composite oxide single phase having an ABO$_3$-type perovskite structure containing titanium, manganese, calcium, aluminum, and bismuth. The atomic ratio (molar ratio) of manganese to titanium [Mn]/[Ti] was 1.00, the atomic ratio (molar ratio) of aluminum to titanium and manganese [Al]/([Ti]+[Mn]) was 0.11, and the atomic ratio (molar ratio) of bismuth to titanium and manganese [Bi]/([Ti]+[Mn]) was 0.0053.

(Evaluation 3) Dispersity

First, a sample, an alkyd resin (ALUKIDIR J-524IM manufactured by DIC Corporation), and a melamine resin (AMIDIR J-820 manufactured by DIC Corporation) were adjusted to make PVC (pigment volume concentration) =19.2, PB (pigment/resin weight ratio)=0.8, and SVC (solid content volume concentration)=46.0%, thereby preparing a paint. As to the prepared paint, based on JIS K 5600-2-5, the depth of the formation of fine undispersed particles was evaluated using a fineness gauge having a maximum depth of 100 μm. The evaluation was performed three times, and the average of three measurements was taken as the dispersity (μm). It can be said that the lower the value of dispersity, the higher the dispersibility of pigment particles in the paint.

(Evaluation 4) Reflectance of Powder

For the measurement of the near-infrared reflectance of a powder, a UV-Vis-NIR spectrophotometer (V-670 manufactured by Nippon Denshoku Industries Co., Ltd.) was used. The sample in a powder form was placed in a special cell for measurement, and the spectral reflectance in a range of 300 to 2500 nm was measured.

Table 2 shows the evaluation results of the specific surface area and the acid resistance (color change and gloss change rate), the dispersity, and the measurement results of the reflectance at a wavelength of 1200 nm of each sample. As shown by Samples I to N, when Al and Bi were added and calcined, the acid resistance effect further increased over Sample A. It was shown that when the atomic ratio (molar ratio) of aluminum to titanium and manganese [Al]/([Ti]+[Mn]) is more than 0.01, the acid resistance improving effect is enhanced. In particular, when the ratio was more than 0.015, high acid resistance was exhibited. However, when the [Al]/([Ti]+[Mn]) further increased over 0.1, color changes were observed, and the dispersity also increased. In addition, the comparison between Samples K and O shows an improvement in acid resistance, thereby confirming the acid resistance improving effect of the addition of Bi.

As shown in Table 2, among the samples obtained by the production method of the present invention, in Samples K to N, because the specific surface area was 1.6 m²/g or more and less than 3.0 m²/g, the dispersibility measured with a fineness gauge was 20 μm or less, that is, the dispersity was particularly excellent, and these samples were able to be dispersed well in a paint.

Figure 2:
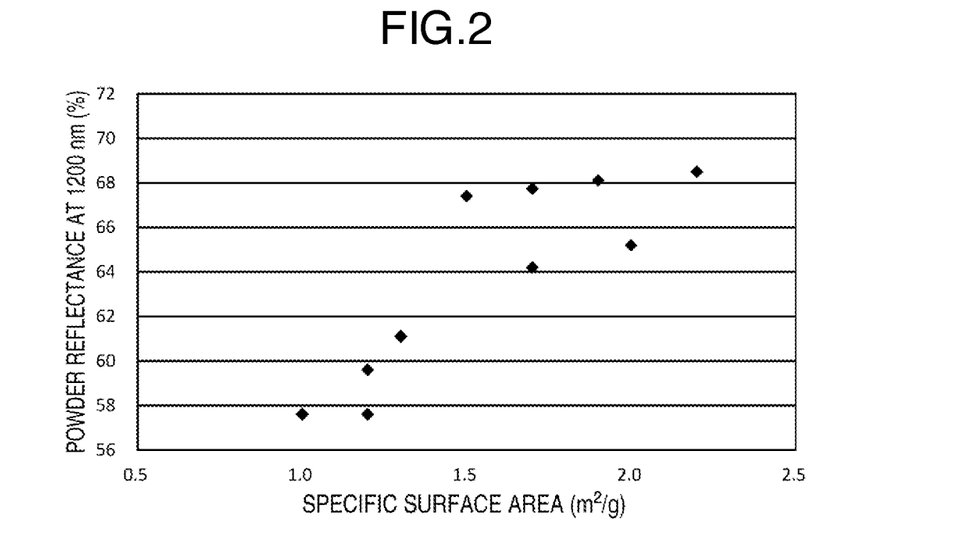
FIG. 2 shows the relationship between the specific surface area and reflectance at a wavelength of 1200 nm of each sample in Experiment 2.
Figure 3:
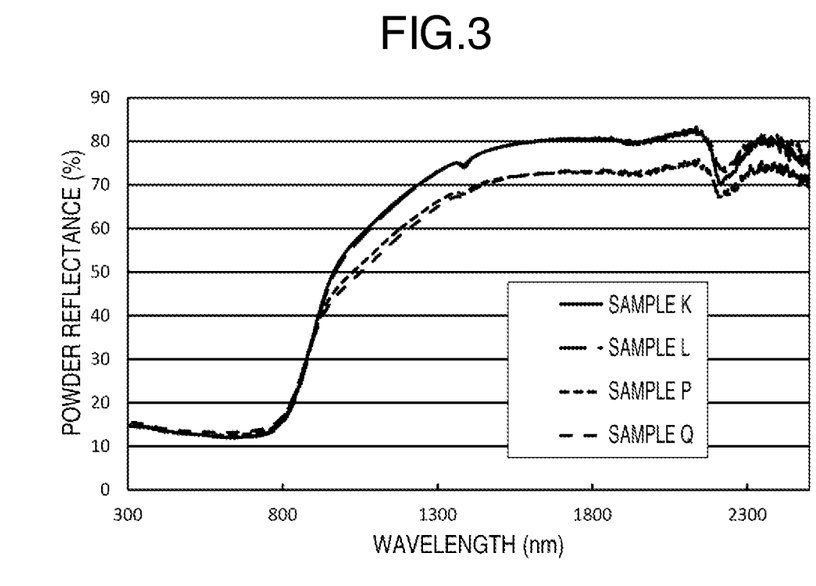
FIG. 3 shows the spectral reflectance curves of powders of Samples K, L, P, and Q in Experiment 2.

FIG. 2 shows a graph plotting the specific surface area and the powder reflectance at a wavelength of 1200 nm, and FIG. 3 shows the spectral reflectance curves of Samples K, L, P, and Q as representatives. As can be seen from FIG. 2, the powder reflectance properties at a wavelength of 1200 nm have an inflection point near a specific surface area of 1.5 m²/g. When the specific surface area was higher, the powder reflectance tended to increase. In Samples K to N having a specific surface area of 1.5 m²/g or more, as compared with Samples P to S each having the same composition and a specific surface area of less than 1.5 m²/g, the exhibited reflectance was higher by about 7 to 9 points, indicating higher near-infrared reflectance. In addition, as in FIG. 3, it can be seen that although the reflectance in a visible light range is suppressed low because of the black color, at a wavelength of about 900 nm or more, Samples K and L have higher reflectance than Samples P and Q.

using the weighting factor described in JIS K 5602 to determine the solar reflectance (%) of the paint film.

Figure 4:
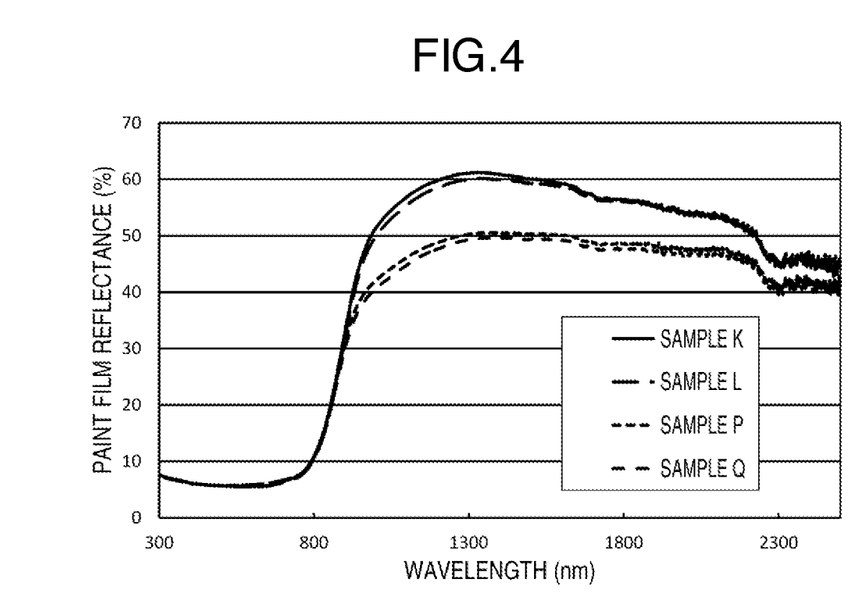
FIG. 4 shows the spectral reflectance curves of paint films produced using Samples K, L, P, and Q in Experiment 2.

FIG. 4 shows the spectral reflectance curves of paint films prepared using Samples K, L, P, and Q. It can be seen that although the reflectance in a visible light range is suppressed low because of the black color, at a wavelength of about 900 nm or more, Samples K and L have higher reflectance than Samples P and Q.

Table 3 shows the solar reflectance of the paint film determined using the weighting factor described in JIS K 5602. It can be seen that as with the reflectance of a powder, although the reflectance in a visible light range is suppressed low because of the black color, at a wavelength of 780 to 2500 nm, Samples K and L have higher reflectance and better near-infrared reflective properties than Samples P and Q.

TABLE 3

|  |  | Solar reflectance (%) (JIS K 5602) | | |
| --- | --- | --- | --- | --- |
|  | Sample | 300~2500 nm | 300~780 nm | 780~2500 nm |
| Example 5 | K | 23.1 | 6.1 | 44.5 |
| Example 6 | L | 22.6 | 6.0 | 43.6 |
| Example 11 | P | 20.3 | 6.2 | 38.0 |
| Example 12 | Q | 19.9 | 6.2 | 37.1 |

As a result of measuring the blackness of Samples A to S in the Hunter Lab color space (Lab colorimetric system), each sample had a lightness index L-value of 20 or less.

INDUSTRIAL APPLICABILITY

The present invention is capable of improving the acid resistance of a near-infrared reflective black pigment containing at least calcium element, titanium element, and manganese element, and can be used for various applications. In particular, the invention is effective in relieving the

TABLE 2

| | Sample | Al/ (Ti + Mn) | Bi/ (Ti + Mn) | Specific Surface Area (m²/g) | Color change | Gloss Change Rate (%) | Dispersity (μm) | Reflectance at 1200 nm (%) |
| --- | --- | --- | --- | --- | --- | --- | --- | --- |
| Example 1 | A | 0 | 0 | 2.2 | ○ | 72.6 | — | — |
| Example 3 | C | 0 | 0 | 1.5 | ○ | 100 | 50 | 67.4 |
| Example 4 | I | 0.011 | 0.0053 | 2.0 | ○ | 85.6 | — | — |
| Example 5 | J | 0.017 | 0.0053 | 2.7 | Δ | 79.4 | — | — |
| Example 6 | K | 0.017 | 0.0053 | 1.9 | ○ | 99.6 | 10 | 68.1 |
| Example 7 | L | 0.034 | 0.0053 | 1.7 | ○ | 100 | 10 | 67.7 |
| Example 8 | M | 0.055 | 0.0053 | 2.0 | ○ | 100 | 10 | 65.2 |
| Example 9 | N | 0.11 | 0.0053 | 1.7 | Δ | 99.4 | 20 | 64.2 |
| Example 10 | O | 0.017 | 0 | 2.2 | ○ | 94.7 | — | 68.5 |
| Example 11 | P | 0.017 | 0.0053 | 1.3 | ○ | 100 | 60 | 61.1 |
| Example 12 | Q | 0.034 | 0.0053 | 1.2 | ○ | 100 | 40 | 59.6 |
| Example 13 | R | 0.055 | 0.0053 | 1.0 | ○ | 100 | 50 | 57.6 |
| Example 14 | S | 0.11 | 0.0053 | 1.2 | ○ | 100 | 50 | 57.6 |

(Evaluation 5) Reflectance of Paint Film

A paint was prepared through the same procedure as in Evaluation 3. The paint was applied to a black-and-white chart using a #30 bar coater and baked at 110° C. for 30 minutes, thereby preparing a paint film. The spectral reflectance of the paint film on the black substrate in a range of 300 to 2500 nm was measured using a UV-Vis-NIR spectrophotometer (V-670 manufactured by Nippon Denshoku Industries Co., Ltd.). The measured data was calculated heat island phenomenon, increasing the cooling efficiency of buildings in summer, and the like, and thus is industrial applicability.

The invention claimed is:

1. A near-infrared reflective black pigment comprising at least a calcium element, a titanium element, a manganese element, an aluminum element, and a bismuth element and having a perovskite phase as a main phase, wherein an atomic ratio Bi/(Ti+Mn) is 0.02 or less when the atomic ratio is expressed as the ratio of an atomic content of the bismuth element (Bi) to a sum of an atomic content of the titanium element (Ti) and an atomic content of the manganese element (Mn), wherein a solar reflectance in a wavelength range of 780 to 2500 nm in the form of a paint film containing the near-infrared reflective black pigment is 35% or more, and wherein the solar reflectance is calculated from a first spectral reflectance of the paint film on a black substrate in a range of 300 to 2500 nm by multiplying the first spectral reflectance by a weighting factor according to JIS K 5602, and the first spectral reflectance is measured using a UV-Vis-NIR spectrophotometer in which the paint film is applied to a black-and-white chart using a number 30 bar coater and baked at 110° C. for 30 minutes.

2. The near-infrared reflective black pigment according to claim 1, wherein an atomic ratio Al/(Ti+Mn) is 0.1 or less when the atomic ratio is expressed as the ratio of an atomic content of the aluminum element (Al) to a sum of an atomic content of the titanium element (Ti) and an atomic content of the manganese element (Mn).

3. The near-infrared reflective black pigment according to claim 2, wherein when expressed as a lightness index L-value in a Hunter Lab color space, namely a Lab colorimetric system, the L-value is 20 or less.

4. The near-infrared reflective black pigment according to claim 1, having a BET specific surface area of 1.0 m$^2$/g or more and less than 3.0 m$^2$/g.

5. The near-infrared reflective black pigment according to claim 4, wherein when expressed as a lightness index L-value in a Hunter Lab color space, namely a Lab colorimetric system, the L-value is 20 or less.

6. The near-infrared reflective black pigment according to claim 1, wherein when expressed as a lightness index L-value in a Hunter Lab color space, namely a Lab colorimetric system, the L-value is 20 or less.

7. A method for producing a near-infrared reflective black pigment, comprising mixing at least a calcium element, a titanium element, an aluminum element, a bismuth element and a manganese element by a wet milling method, followed by calcining the mixture at a temperature higher than 1100° C., wherein the near-infrared reflective black pigment has a perovskite phase as a main phase and an atomic ratio Bi/(Ti+Mn) is 0.02 or less when the atomic ratio is expressed as the ratio of an atomic content of the bismuth element (Bi) to a sum of an atomic content of the titanium element (Ti) and an atomic content of the manganese element (Mn) and wherein a solar reflectance in a wavelength range of 780 to 2500 nm in the form of a paint film containing the near-infrared reflective black pigment is 35% or more, and wherein the solar reflectance is calculated from a first spectral reflectance of the paint film on a black substrate in a range of 300 to 2500 nm by multiplying the first spectral reflectance by a weighting factor according to JIS K 5602, and the first spectral reflectance is measured using a UV-Vis-NIR spectrophotometer in which the paint film is applied to a black-and-white chart using a number 30 bar coater and baked at 110° C. for 30 minutes.

8. The method for producing a near-infrared reflective black pigment according to claim 7, wherein the near-infrared reflective black pigment has a BET specific surface area of 1.0 m$^2$/g or more and less than 3.0 m$^2$/g.

9. The method for producing a near-infrared reflective black pigment according to claim 7, wherein when expressed as a lightness index L-value in a Hunter Lab color space, namely a Lab colorimetric system, the L-value of the near-infrared reflective black pigment is 20 or less.

10. The method for producing a near-infrared reflective black pigment according to claim 7, wherein an atomic ratio Al/(Ti+Mn) is 0.1 or less when the atomic ratio is expressed as the ratio of an atomic content of the aluminum element (Al) to a sum of an atomic content of the titanium element (Ti) and an atomic content of the manganese element (Mn) in the near-infrared reflective black pigment.

* * * * *